United States Patent
Liu

(10) Patent No.: US 10,418,054 B1
(45) Date of Patent: Sep. 17, 2019

(54) DUAL PERPENDICULAR MAGNETIC RECORDING (PMR) WRITER BASE STRUCTURES AND MIRROR IMAGED ASYMMETRICAL MAGNETIC CORE SHAPES FOR REDUCED WRITER-WRITER SPACING (WWS)

(71) Applicant: Headway Technologies, Inc., Milpitas, CA (US)

(72) Inventor: Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/913,167

(22) Filed: Mar. 6, 2018

(51) Int. Cl.
*G11B 5/265* (2006.01)
*G11B 5/31* (2006.01)
*G11B 5/147* (2006.01)
*G11B 5/127* (2006.01)

(52) U.S. Cl.
CPC ............ *G11B 5/315* (2013.01); *G11B 5/1278* (2013.01); *G11B 5/1475* (2013.01); *G11B 5/265* (2013.01); *G11B 5/3116* (2013.01); *G11B 5/3123* (2013.01); *G11B 5/3153* (2013.01); *G11B 5/3163* (2013.01); *G11B 5/3173* (2013.01)

(58) Field of Classification Search
CPC ....... G11B 5/265; G11B 5/315; G11B 5/3153; G11B 5/3163; G11B 5/3173
USPC ..... 360/121, 125.04, 125.05, 125.13, 125.15
See application file for complete search history.

(56) References Cited

U.S. PATENT DOCUMENTS

| | | | |
|---|---|---|---|
| 6,665,136 B2 | 12/2003 | Clinton et al. | |
| 7,508,619 B2 * | 3/2009 | Okamoto | G11B 5/012 360/121 |
| 7,907,360 B2 | 3/2011 | Mak et al. | |
| 8,218,264 B1 | 7/2012 | Sasaki et al. | |
| 8,274,758 B2 | 9/2012 | Wu et al. | |
| 8,810,764 B2 | 8/2014 | Nishida et al. | |
| 8,828,248 B2 | 9/2014 | Mao et al. | |
| 8,836,059 B2 | 9/2014 | Ahn et al. | |
| 9,171,561 B1 | 10/2015 | Gadbois et al. | |
| 9,613,642 B1 | 4/2017 | Erden et al. | |

(Continued)

OTHER PUBLICATIONS

Co-pending U.S. Appl. No. 15/942,640, filed Apr. 2, 2018, by Kowang Liu et al., "Magnetic Core and Coil Design for Double Perpendicular Magnetic Recording (PMR) Writers," 50 pgs.

*Primary Examiner* — Jefferson A Evans
(74) *Attorney, Agent, or Firm* — Saile Ackerman LLC; Stephen B. Ackerman

(57) ABSTRACT

A dual PMR writer is disclosed wherein a first main pole (MP1) in writer 1 is a mirror image of a second main pole (MP2) in writer 2 with respect to a center plane aligned orthogonal to the air bearing surface (ABS). MP1 and MP2 may have an asymmetrical top-down shape to reduce writer-writer spacing (WWS) and read write offset (RWO) when a single or double reader is positioned down-track at the center plane. Accordingly, there is less track misregistration and better area density capability. Each of MP1 and MP2 as well as a top yoke (TY), and a tapered bottom yoke (tBY) have a rectangular back portion of width "w" from 4 to 10 microns. Spacing between MP1 and MP2 back portions may be ≥4 microns to prevent cross-talk. RWO is reduced from ≥4 microns for symmetrical TY/MP/tBY shapes to 3 microns or less for asymmetrical shapes.

31 Claims, 11 Drawing Sheets

(56) References Cited

U.S. PATENT DOCUMENTS

| | | |
|---|---|---|
| 9,754,612 B2 | 9/2017 | Wei et al. |
| 9,805,744 B1* | 10/2017 | Xue ................. G11B 5/3116 |
| 9,842,614 B2* | 12/2017 | Hutchinson ......... G11B 5/3133 |
| 9,865,301 B1* | 1/2018 | Wiesen ................. G11B 27/36 |
| 9,934,807 B2* | 4/2018 | Macken ............... G11B 5/6076 |
| 10,210,891 B1* | 2/2019 | Tian ..................... G11B 5/012 |
| 10,279,451 B1* | 5/2019 | Liu ..................... B24B 37/048 |
| 2008/0024900 A1* | 1/2008 | Okamoto .............. G11B 5/012 |
| | | 360/70 |
| 2009/0251821 A1* | 10/2009 | Song .................... G11B 5/1278 |
| | | 360/110 |
| 2010/0007986 A1 | 1/2010 | Mak et al. |
| 2010/0157484 A1* | 6/2010 | Etoh ................... G11B 5/1278 |
| | | 360/319 |
| 2011/0242701 A1* | 10/2011 | Ohtake ................. B82Y 10/00 |
| | | 360/99.08 |
| 2014/0153134 A1* | 6/2014 | Han ..................... G11B 5/012 |
| | | 360/234.3 |
| 2014/0307348 A1* | 10/2014 | Min ..................... G11B 5/1278 |
| | | 360/122 |
| 2016/0254014 A1 | 9/2016 | Biskeborn et al. |
| 2017/0256275 A1 | 9/2017 | Hutchinson et al. |

* cited by examiner

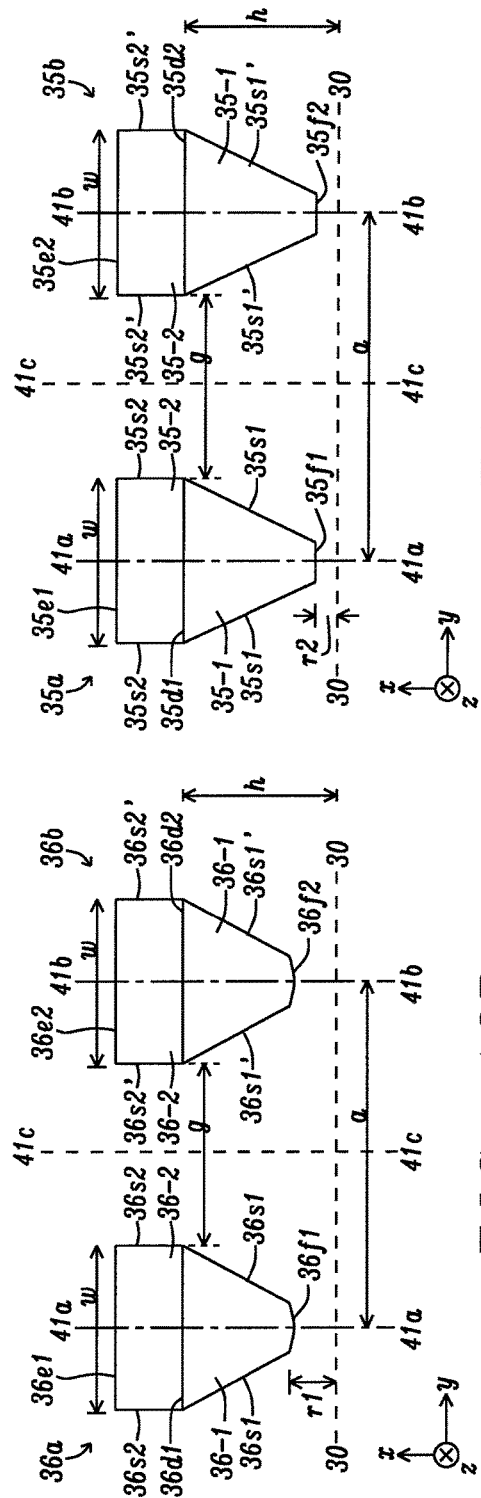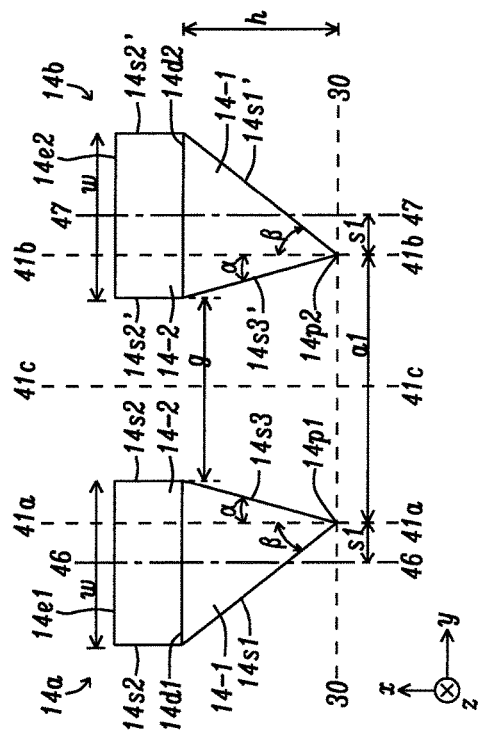
FIG. 12B
FIG. 12C
FIG. 13A

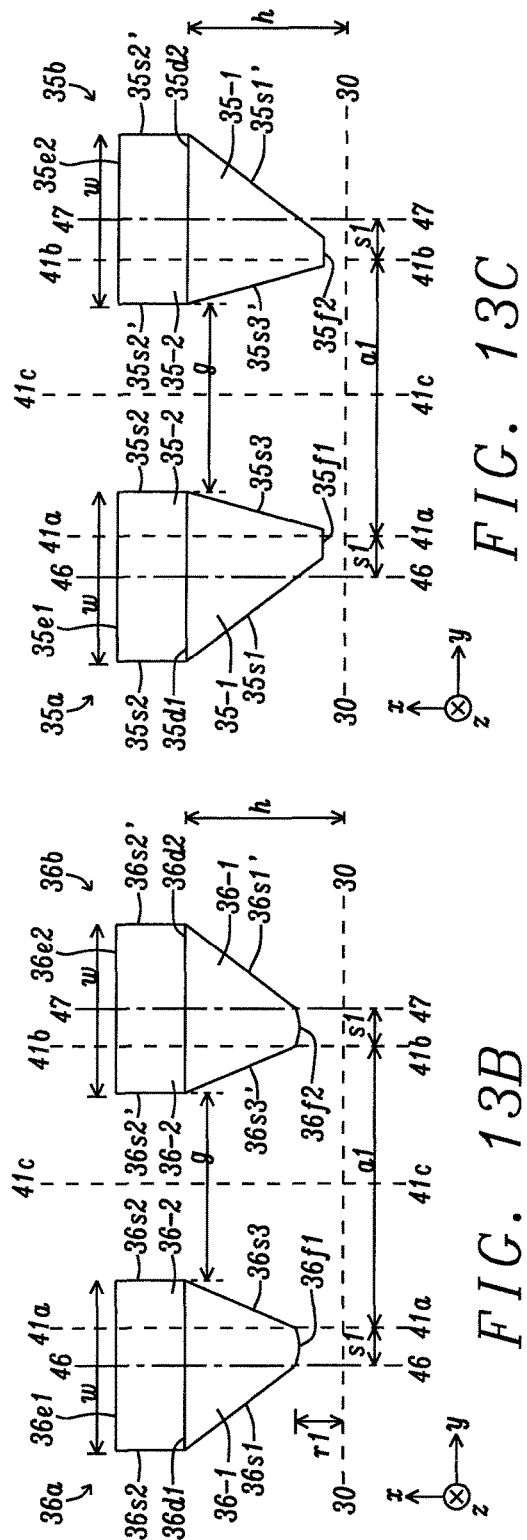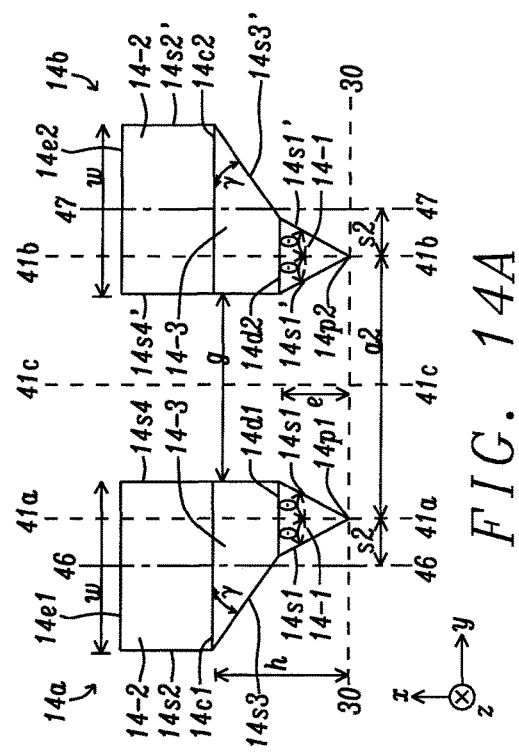

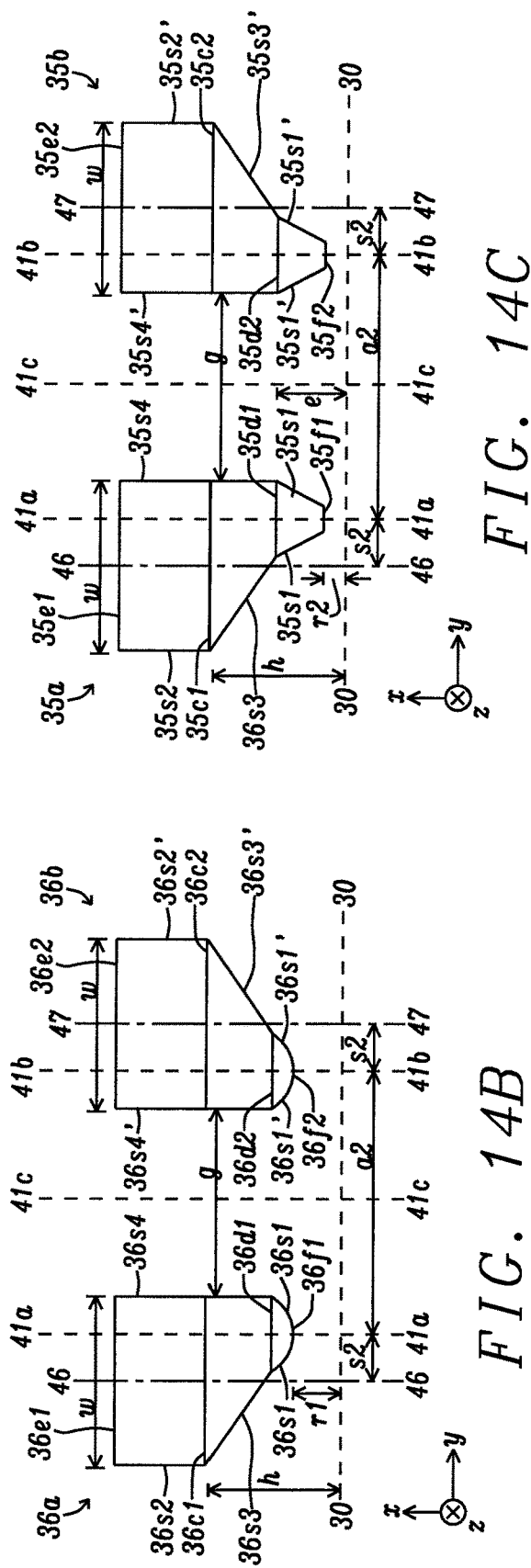

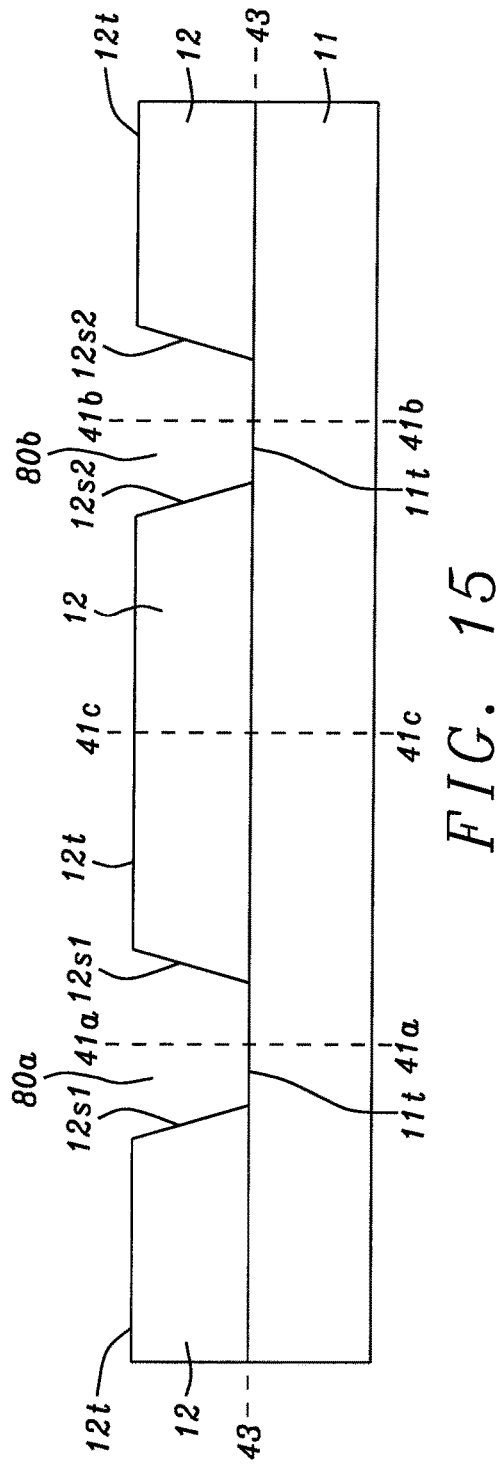
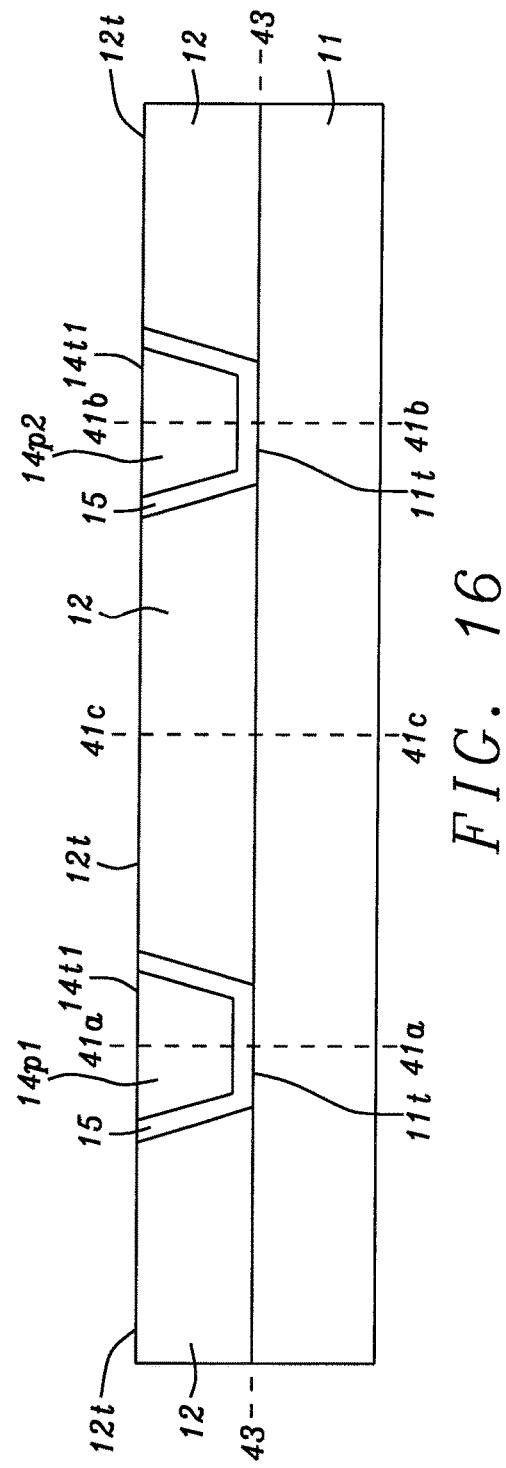
FIG. 15
FIG. 16

DUAL PERPENDICULAR MAGNETIC RECORDING (PMR) WRITER BASE STRUCTURES AND MIRROR IMAGED ASYMMETRICAL MAGNETIC CORE SHAPES FOR REDUCED WRITER-WRITER SPACING (WWS)

RELATED PATENT APPLICATIONS

This application is related to the following: U.S. Pat. No. 9,754,612; Ser. No. 15/942,640, filing date Apr. 2, 2018; Ser. No. 15/874,986, filing date Jan. 19, 2018; and Ser. No. 15/942,756, filing date Apr. 2, 2018; which are assigned to a common assignee and herein incorporated by reference in their entirety.

TECHNICAL FIELD

The present disclosure relates to a PMR write head that is configured to have two writers per slider and a symmetrical or asymmetrical main pole, top yoke, and tapered bottom yoke design with respect to a center plane separating the two writers to enable a reduction in read write offset (RWO) and enhanced area density capability (ADC) when integrated in a head gimbal assembly (HGA).

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing loop and a leading loop. The trailing loop is comprised a trailing shield structure with a front side at the ABS, an uppermost (PP3) trailing shield that arches over the driving coil and connects with a top yoke (TY). The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and that is connected to a return path (RTP) having a front side recessed from the ABS. The RTP extends back to the BGC and enables magnetic flux in the leading loop pathway to return from the leading shield at the ABS and through the BGC to the MP for faster saturation speed, better adjacent trace interference (ATI) and enhanced wide area track erasure (WATE) potential.

Dual write shield (DWS) designs that feature complete leading and trailing loops were invented for adjacent track erasure (ATE) improvement by reducing stray field in side shields and in the leading shield. Accordingly, a PMR head has a great advantage over LMR in providing higher write field, better read back signal, and potentially much higher areal density. With the growing demand for cloud storage and cloud-based network computing, high and ultra high data rate recording becomes important for high-end disk drive applications.

To achieve areal density in a HDD beyond 2 terabytes per platter (TBPP) for conventional PMR, dual writer designs have been proposed where the better of the two writers is determined during back end testing, and then the better writer is paired with a suspension and integrated in a HGA. However, there is a need to continually decrease writer-writer spacing in order to reduce RWO and meet ADC requirements, and to provide magnetic core shapes that are compatible with various pathways for magnetic flux to return to the main pole layer. Therefore, an improved dual PMR writer design is needed to enable additional reduction in WWS without increasing the complexity of the fabrication process.

SUMMARY

One objective of the present disclosure is to provide a dual PMR writer design that is compatible with multiple base writer structures and that enables a reduced RWO compared with conventional dual PMR writer designs.

Another objective of the present disclosure is to provide a dual PMR writer according to the first objective that is flexible in having compatibility with separate or shared leading and trailing loops for magnetic flux return to the main pole in each writer.

These objectives are achieved by configuring a dual PMR writer (two writers per slider) with a base writer structure having one of four layouts. According to one embodiment, there is an nDWS design wherein the trailing loop is intact but the leading loop terminates at the leading shield at the ABS. In another embodiment the nDWS design is modified with the extension of the leading loop to include a return path (RTP) layer but omitting the BGC. There are also two DWS designs that have complete leading and trailing loops. In the DWS BGC design, a front side of the S2C connector is moved to the ABS to effectively lengthen the down-track distance of the leading shield at the ABS.

In all designs, there is a cross-track distance at the ABS known as writer-writer spacing (WWS) or "a" between the centers of the two main pole tips that is preferably ≤10 microns such that the RWO is minimized when there is a single reader or double reader formed a down-track distance below the main poles and at a center plane that separates the two writers and is orthogonal to the ABS.

From a top-down view, each writer has a main pole layer (MP), a top yoke (TY) that adjoins a top surface of the MP, and a tapered bottom yoke (tBY) contacting a bottom surface of the MP. According to a first embodiment with a symmetrical layout, MP1, TY1, and tBY1 in writer 1 are symmetrical with respect to a first plane that bisects the first main pole tip and MP1 backend, and is parallel to the center plane. Likewise, writer 2 has a MP2, TY2, and tBY2 that are symmetrical with respect to a second plane formed parallel to the center plane, and that bisects the second main pole tip and MP2 backend. Moreover, each MP may be comprised of a front portion having a substantially triangular shape with two sides of equal length extending backward from a main pole tip at the ABS at angle θ (with respect to the first or second plane) to a backside at a first height from the ABS. Each MP is also comprised of a back portion with a rectangular shape wherein two sides aligned orthogonal to the ABS extend from the front portion backside at the first height (h1) to the backend that is parallel to the ABS. The TY and tBY also have rectangular back portions, but have front sides that are recessed from the ABS such that the front portions thereof are substantially trapezoidal shaped.

According to a second embodiment based on asymmetrical shapes for the MP, TY, and tBY in each writer, each MP has a substantially triangular shaped front portion wherein a MP tip is bisected by the first plane or second plane, but there are two sides of unequal length extending from the MP tip to a backside at the first height. Furthermore, the first MP back portion is now bisected by a third plane that is parallel to the center plane, and is a cross-track distance "s" farther from the center plane than the first plane. Similarly, the second MP back portion is bisected by a fourth plane formed parallel to the center plane and that is the cross-track distance "s" farther from the center plane than the second plane. Thus, a first "inner" side of the MP front portion that faces the center plane is formed at angle α with respect to the first plane in MP1 or with respect to the second plane in MP2. A second "outer" side of the MP front portion that faces away from the center plane is formed at angle β with respect to the first plane in MP1 or with respect to the second plane in MP2 where β>α which makes the second side longer than the first side. In both of the first and second embodiments, the backside of each MP front portion has a cross-track width "w" equal to the width of the MP backend.

According to a third embodiment based on asymmetrical MP, TY, and tBY shapes in each writer, each MP has a rectangular shaped back portion having width "w" that is bisected by the third or fourth plane as in the previous embodiment. Moreover, there is a substantially triangular shaped front portion with two sides of equal length extending from a MP tip to a second backside at a second height (h2) from the ABS where h2<h1. Each of the two sides is formed at angle α with respect to the first plane in MP1 or with regard to the second plane in MP2. There is also a trapezoidal shaped center portion in each MP with a front side coinciding with the second backside of the front portion, and having a first backside of width "w" at height h1 that interfaces with the back portion. The center portion has a third side aligned orthogonal to the ABS and facing the center plane that is an extension of an inner side in the rectangular back portion, and a fourth side that forms an angle γ with the third plane in MP1 or fourth plane in MP2, and that connects the outer side of the triangular shaped front portion with an outer side of the rectangular shaped back portion.

In the first embodiment with a symmetrical MP/TY/tBY scheme, WWS is expressed by the equation (a=w+g) where g is the spacing between inner sides of the rectangular shaped MP back portions. In the second and third embodiments, the asymmetrically shaped MP/TY/tBY magnetic core enables WWS to be reduced according to the equation (a=w+g−2s) thereby advantageously providing a smaller RWO and better ADC than for symmetrically shaped MP/TY/tBY designs.

Preferably, each writer in the dual PMR writer structure has the same base structure, and is fabricated with the same process steps used to build a single writer in order to minimize product cost.

BRIEF DESCRIPTION OF THE DRAWINGS

FIGS. 12B-12C are top-down views of two top yokes and two tapered bottom yokes, respectively, that adjoin top and bottom sides of the main poles in FIG. 12A.

FIG. 13A is a top-down view of an asymmetric main pole design in which each main pole has a triangular shaped front portion with a pole tip at the ABS, and a rectangular back portion according to an embodiment of the present disclosure.

FIGS. 13B-13C are top-down views of two asymmetric top yokes and two asymmetric tapered bottom yokes, respectively, that adjoin top and bottom sides of the main poles in FIG. 13A.

FIG. 14A is a top-down view of an asymmetric main pole design in which each main pole has a triangular front portion with a pole tip at the ABS, a rectangular back portion, and a trapezoidal shaped middle portion according to an embodiment of the present disclosure.

FIGS. 14B-14C are top-down views of two asymmetric top yokes and two asymmetric tapered bottom yokes, respectively, that adjoin top and bottom sides of the main poles in FIG. 14A.

FIGS. 15-16 show a sequence of steps for depositing two main pole layers simultaneously to form a dual PMR writer on a substrate.

DETAILED DESCRIPTION

Figure 1:
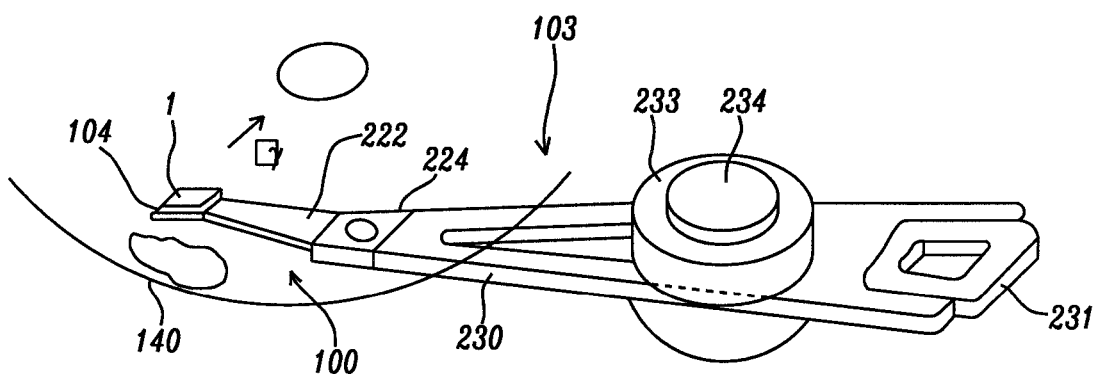
FIG. 1 is a perspective view of a head arm assembly of the present disclosure.

The present disclosure relates to a dual PMR writer scheme having a symmetrical or asymmetrical ABS design to provide reduced writer-writer spacing (WWS) at the ABS, and a smaller RWO for enhanced ADC. In particular, the top yoke (TY) and tapered bottom yoke (tBY) adjoining top and bottom MP surfaces, respectively, have substantially the same shape and dimensions as the MP except the TY and tBY each have a front side that is recessed from the ABS rather than at the ABS as in the MP. In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The terms "inner side" and "outer side" refer to sides of the MP/TY/tBY structure that face a center plane or face away from the center plane, respectively, which separates the first writer from the second writer.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
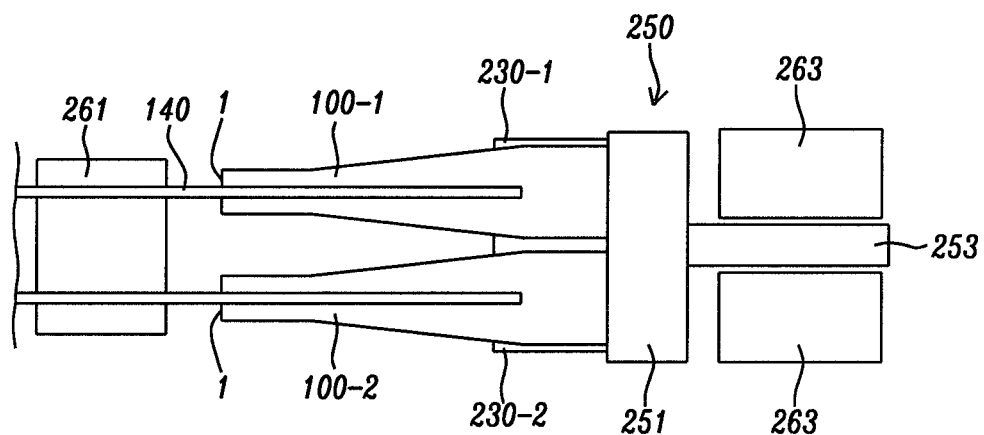
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
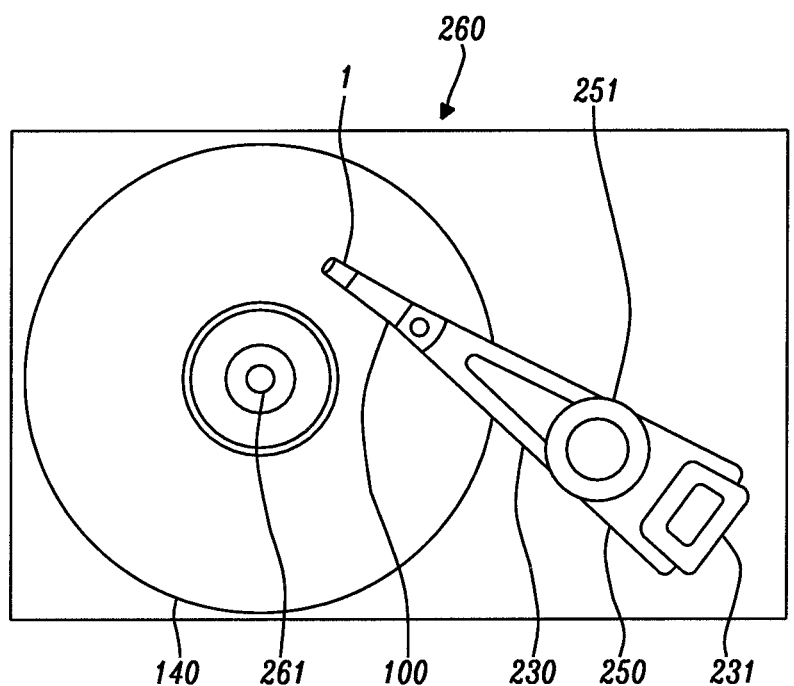
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
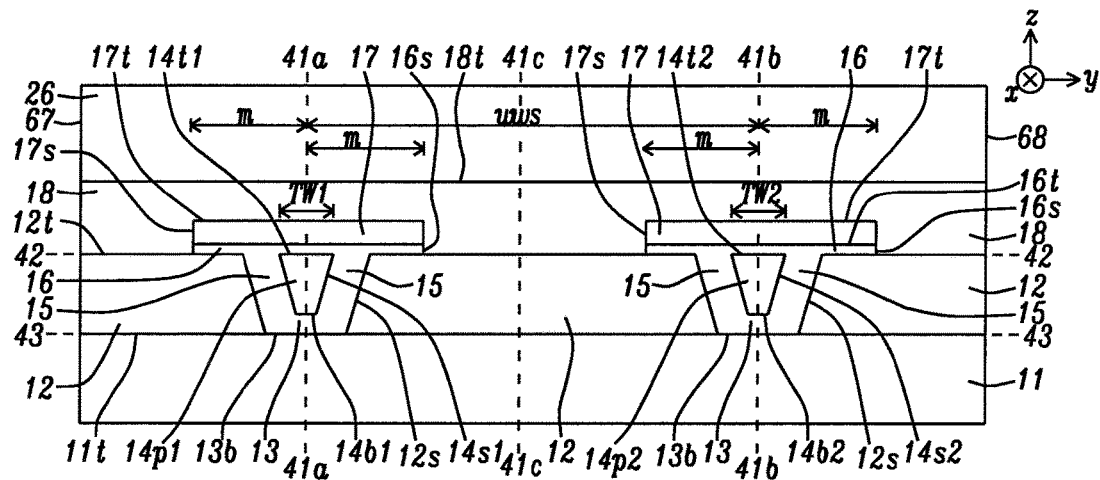
FIG. 4 is an ABS view of a dual PMR writer scheme wherein two main poles have a cross-track writer-writer spacing (WWS), and share a trailing shield and leading shield at the ABS according to an embodiment of the present disclosure.

In FIG. 4, an ABS view is illustrated of a dual PMR writer structure according to one embodiment of the present disclosure where the first writer (writer 1) has a first main pole tip 14p1 and track width TW1 that are bisected by plane 41a-41a, and the second writer (writer 2) has a second main pole tip 14p2 and track width TW2 that are bisected by plane 41b-41b. Center plane 41c-41c separates the two writers, is equidistant from and parallel to planes 41a-41a and 41b-41b, and is orthogonal to the ABS. WWS is the cross-track distance between plane 41a-41a and plane 41b-41b. First and second main pole tips are shown with a trapezoidal shape but may have different shapes in other embodiments. Trailing edges 14t1, 14t2 of the first and second main pole tips, respectively, are formed on plane 42-42 that is orthogonal to the center plane.

In the exemplary embodiment, the main pole layers share a trailing shield 18, and leading shield 11 that are bisected by center plane 41c-41c, and each main pole tip 14p1, 14p2 is surrounded by a gap layer that comprises leading gap 13, side gaps 15, and write gap 16. Hot seed layer 17 is formed on the write gap. However, the present disclosure also anticipates an alternative embodiment (not shown) where each writer has a separate leading shield and trailing shield structure. Note that the trailing shield structure further includes PP3 trailing shield 26 (FIGS. 5-8) that forms a magnetic connection between trailing shield 18 and TY 36a in writer 1 (or TY 36b in writer 2). The front side 26f of the PP3 trailing shield may be exposed at the ABS, or recessed from the ABS as shown in FIGS. 5-8.

Returning to FIG. 4, both hot seed layer sides 17s and both write gap sides 16s may be coplanar and formed a distance m from plane 41a-41a in the first writer, and an equivalent distance m from plane 41b-41b in the second writer. First and second main pole tips have sides 14s1 and 14s2, respectively, and top edges 14t1 and 14t2, respectively, which are formed at plane 42-42 that also includes a top surface 12t of side shield layers 12. First and second main pole tips also comprise bottom edges 14b1, 14b2, respectively. Leading shield 11 has a top surface 11t at plane 43-43 which also includes a bottom surface of the leading gap. Plane 42-42 and plane 43-43 are parallel to each other and are orthogonal to the center plane and to the ABS. Side gaps 15 adjoin inner sides 12s1 (writer 1) and 12s2 (writer 2) of the side shields. Trailing shield 18 contacts HS layer side 17s and top surface 17t, and write gap side 16s, and adjoins side shields 12 at plane 42-42. The all wrap around (AWA) shield design has outer sides 67, 68, and features side shields that adjoin the leading shield at plane 43-43.

In all embodiments, WWS is preferably ≤10 microns so that RWO represented here as the cross-track distance (WWS/2) between main pole tip 14p1 and center plane 41c-41c for writer 1, and the cross-track distance (WWS/2) between main pole tip 14p2 and the center plane for writer 2 at the ABS is minimized. Smaller RWO is always preferred for less track misregistration and better ADC.

In related U.S. Pat. No. 9,754,612, we described a combined read/write head structure formed in a single writer. However, the combined read/write head design may be implemented in a dual PMR writer as well by duplicating the single writer design on the opposite side of a center plane such as plane 41c-41c in FIG. 4. The substrate is typically a slider (not shown) formed in an array of sliders on a wafer. After the combined read/write head structure is completed, the wafer is sliced to form rows of sliders. Each row is typically lapped to afford an ABS before dicing to fabricate individual sliders that are paired with a suspension in a head gimbal assembly (HGA) for a hard disk drive (HDD) application.

The present disclosure anticipates that one or more dynamic fly height (DFH) heaters may be formed in one or more insulation (dielectric) layers in a dual PMR writer structure as described in related patent application HT17-032 to control the extent of thermal expansion (protrusion) at the ABS and toward a magnetic medium during a read or write process. Read gap (RG) and write gap (WG) protrusion may be tuned by the placement of the one or more DFH heaters, and by the choice of metal or alloy selected for the DFH heaters since each DFH heater is comprised of a resistor material with a particular thermal and mechanical response to a given electrical input.

Figure 5:
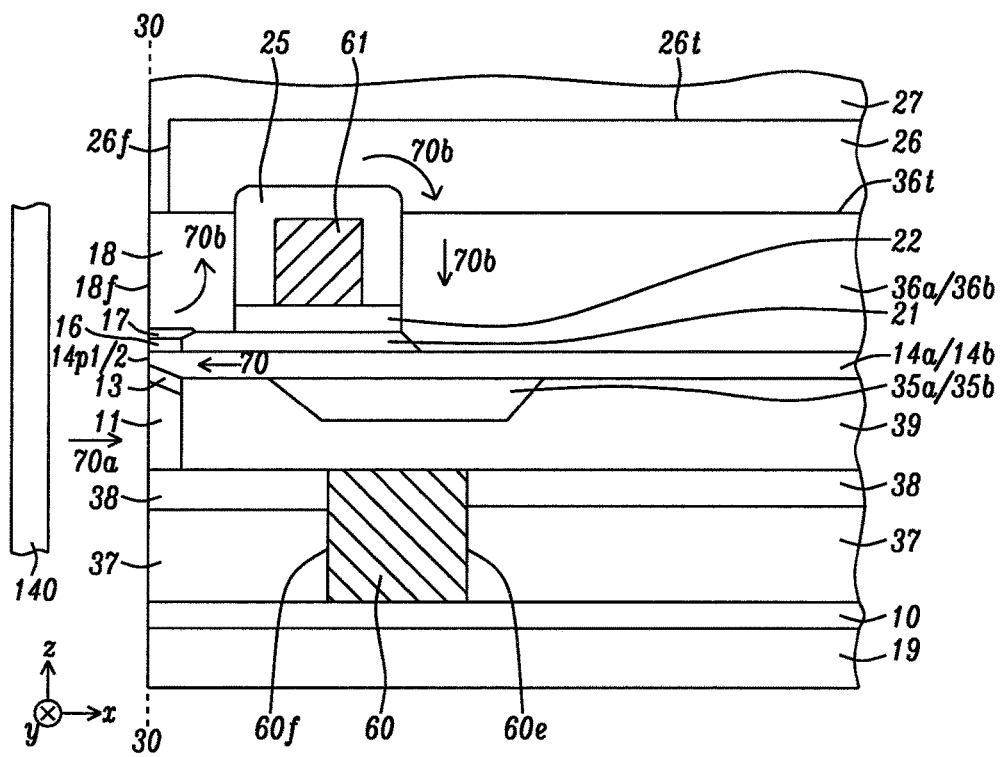
FIG. 5 is a down-track cross-sectional view of a dual PMR writer having a non-DWS (nDWS) layout wherein the leading loop for magnetic flux return terminates at the leading shield according to an embodiment of the present disclosure.

Referring to FIG. 5, the write head portion of a dual PMR writer is illustrated according to one embodiment of the present disclosure. The down-track cross-sectional view is taken along plane 41a-41a in writer 1 or along plane 41b-41b in writer 2 in FIG. 4 and represents a modified version of the nDWS design disclosed in related U.S. Pat. No. 9,754,612. The nDWS approach is beneficial in providing a better return field at the MP trailing edge thereby improving field gradient, BER, and ADC compared with a DWS scheme. The read head is omitted to simplify the drawing and to focus on the leading and trailing loops for magnetic flux return to the MP 14a with pole tip 14p1 in writer 1 (or MP 14b with pole tip 14p2 in writer 2). Note that each of the insulation layers described hereinafter may be comprised of one or multiple layers. Bucking coil 60 is recessed from the ABS 30-30 and formed on insulation layer 10, which in turn is formed on bottommost insulation layer 19. A second stack of layers including insulation layer 37 and overlying insulation layer 38 is formed between the bucking coil front side 60f and ABS, and also adjoins the bucking coil backside 60e. Leading shield 11 is formed on insulation layer 38 at the ABS. Note that the leading loop for flux return 70a terminates at the leading shield since the return path (RTP) and BGC found in other embodiments to be described later are omitted here. Another insulation layer 39 extends from a backside of the leading shield towards a back end of the PMR writer and contacts a top surface of insulation layer 38. Tapered bottom yoke 35a, MP 14a, and TY 36a (or tBY 35b, MP 14b, and TY 36b) are sequentially formed on insulation layer 39. Lead gap 13 and write gap 16 are below and above the MP, respectively, at the ABS.

The trailing loop comprises hot seed layer 17, trailing shield 18 with front side 18f at the ABS 30-30, PP3 trailing shield 26 that is either exposed to ABS (not shown) or recessed from the ABS as shown in FIG. 5, and TY 36a (or TY 36b) with top surface 36t adjoining the PP3 trailing shield behind driving coil 61 so that magnetic flux 70b from magnetic medium 140 is able to return to MP 14a (or to MP 14b). The driving coil is formed on a stack of insulation layers 21/22 and is surrounded on the sides and top surface with insulation layer 25. In some embodiments as shown in related U.S. Pat. No. 9,754,612, the PP3 trailing shield top surface arches over the driving coil instead of having a flat top surface 26t. A protection layer 27 covers the PP3 trailing shield and is made of an insulating material such as alumina.

Figure 6:
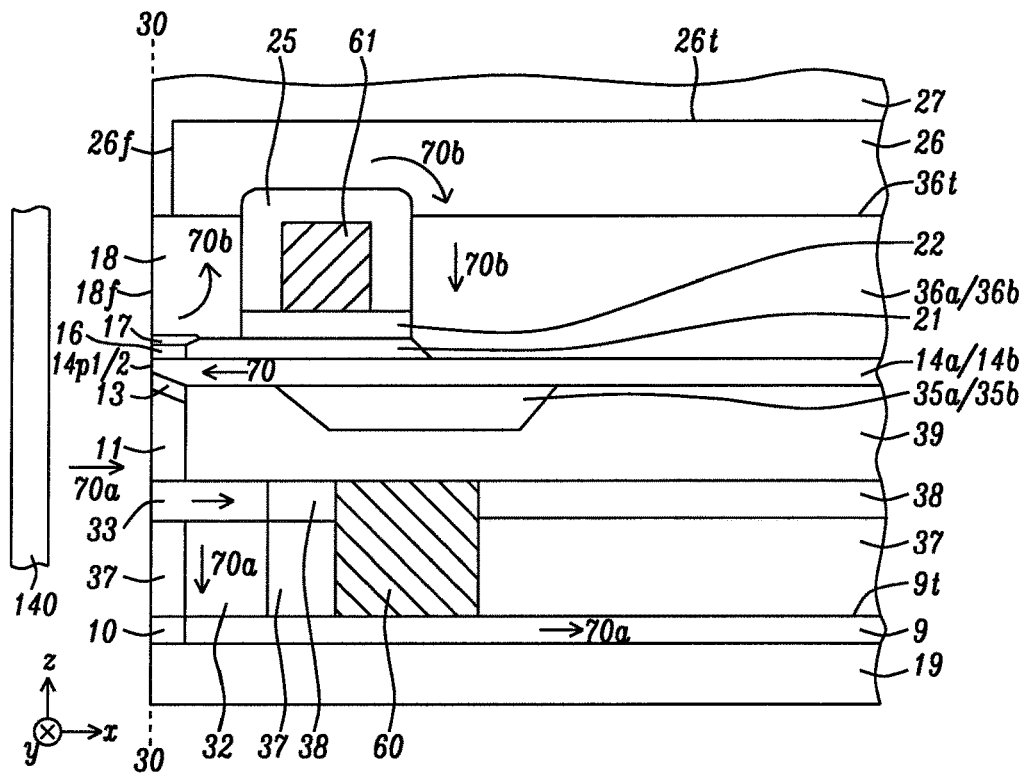
FIG. 6 is a down-track cross-sectional view of a dual PMR writer having a base writer structure in which the back gap connection is omitted in the magnetic flux leading loop according to an embodiment of the present disclosure.

In an alternative embodiment depicted in FIG. 6 and referred to as a rDWS base structure with no BGC, all layers in the writer structure described in the previous embodiment are retained. Moreover, the leading loop is extended to include a LSB magnetic layer 33 contacting a bottom surface of leading shield 11, and that replaces a front portion of insulation layer 39 at the ABS but does not extend to the bucking coil 61. The expanded leading loop also includes S2C connector 32 contacting a bottom surface of LSB 33 and a top surface 9t of RTP 9, and where the S2C connector is separated from the ABS by insulation layer 37. The RTP layer is recessed from the ABS and formed within insulation layer 10. Therefore, magnetic flux 70a may now proceed into the RTP but there is still no BGC to enable flux to reach the tBY 35a (or tBY 35b). This embodiment has the same advantage as the nDWS base structure in the previous embodiment in terms of a better return field at the MP trailing edge.

Figure 7:
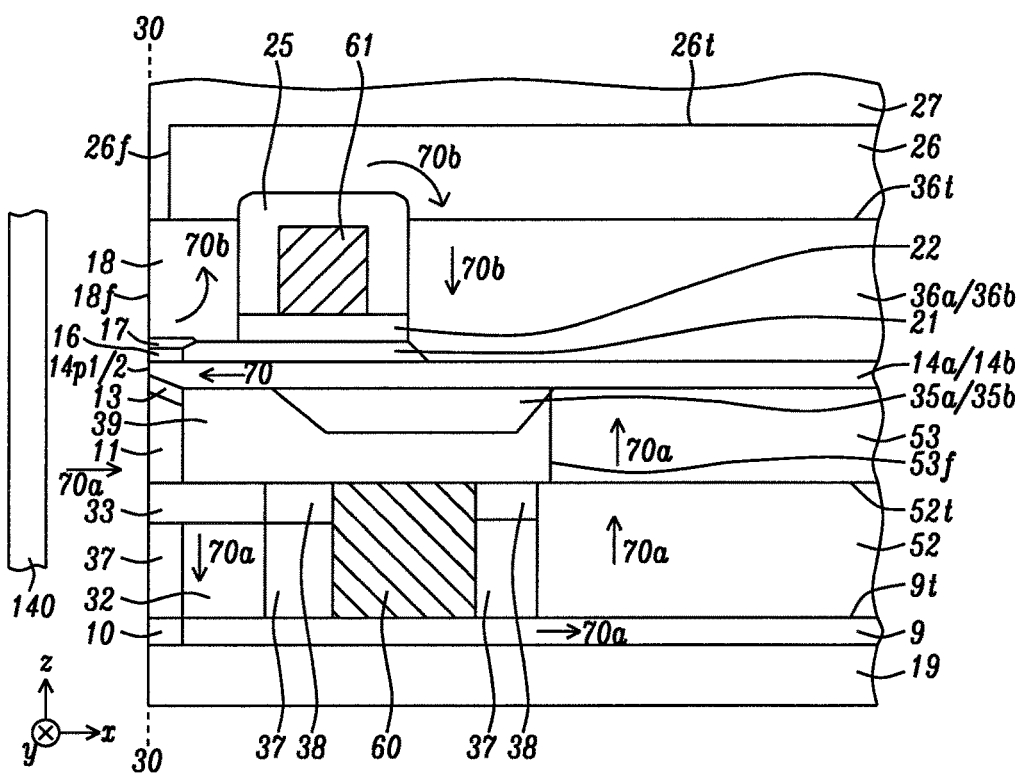
FIG. 7 is a down-track cross-sectional view of a dual PMR writer with a DWS layout wherein the back gap connection (BGC) in the leading loop includes a lower layer and an upper layer according to an embodiment of the present disclosure.

Referring to FIG. 7, another embodiment is depicted of a base structure suitable for a dual PMR writer of the present disclosure. Here, both of the trailing loop with magnetic flux 70b, and leading loop with magnetic flux 70a are complete. All layers are retained from the previous embodiment in FIG. 6, and with the addition of a lower back gap (LBG) layer 52 formed on top surface 9t of RTP 9, and BGC 53 on LBG top surface 52t. The tBY 35a (or tBY 35b) is formed within insulation layer 39 and closer to ABS 30-30 than BGC front side 53f. Thus, the BGC contacts a bottom surface of MP 14a (or MP 14b) behind tBY 35a (or tBY 35b).

Figure 8:
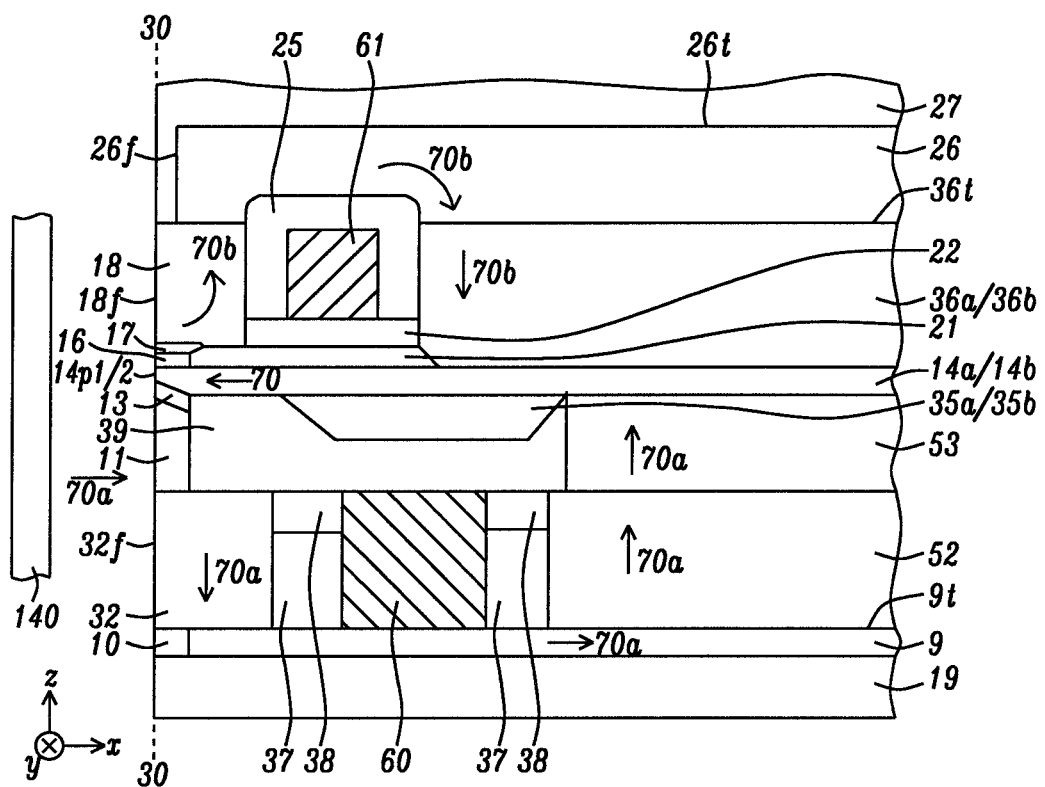
FIG. 8 is a down-track cross-sectional view of the DWS design in FIG. 7 that is modified to include an extended leading shield at the ABS according to another embodiment of the present disclosure.

In FIG. 8, a fourth base structure known as DWS BGC and suitable for a dual PMR writer of the present disclosure is depicted and represents a modification of the previous embodiment in FIG. 7. In particular, LGB 33 and a front portion of insulation layer 37 at the ABS are replaced with an enlarged S2C connector 32 such that a front side 32f thereof is at the ABS 30-30. Effectively, the leading shield is extended downward so that magnetic flux 70a may enter both of leading shield 11 and the S2C connector at the ABS.

In all of the embodiments shown in FIGS. 5-8, the two writers may be fully separated with separate PP3 trailing shield 26, write shields 18, leading shield 11, LSB 33, S2C connector 32, RTP 9, LBG 52, and BGC 53 as well as MP 14a, tBY 35a, and TY 36a in writer 1 separated from MP 14b, tBY 35b and TY 36b, respectively, in writer 2. In another embodiment, PP3 trailing shield 26, write shields 18, leading shield 11, LSB 33, S2C 32, and the RTP are shared while writer 1 and writer 2 have separate LBG, BGC, tBY, TY, and MP. In yet another embodiment, all components in the leading and trailing loops are shared except for tBY 35a in writer 1 (separated from tBY 35b in writer 2), MP 14a separated from MP 14b, and TY 36a in writer 1 (separated from TY 36b in writer 2).

Leading shield 11, LSB 33, S2C 32, BGL 52, BGC 53, and RTP 9 are generally made of NiFe, CoFe, CoFeNi or the like with a saturation magnetization value of 10 kiloGauss (kG) to 16 kG. TY 36a (and 36b), hot seed layer 17, MP 14a (and 14b), and tBY 35a (and 35b) typically have a saturation magnetization value from 19 kG to 24 kG. Trailing shield 18, and the PP3 trailing shield 26 are typically made of materials with a 16 kG to 19 kG magnetic saturation value. The base structures shown in FIGS. 5-8 preferably have well known 1+1T designs for bucking coil 60, and driving coil 61.

An interconnect (not shown) is formed behind the TY/MP/tBY stack of layers to form an electrical connection between the bucking coil 60 and driving coil 61 thereby enabling a write current to generate magnetic flux 70 in MP 14a for writer 1 or in MP 14b for writer 2. It should be understood that alternative write head designs may be employed other than those shown in FIGS. 5-8 without limiting the advantages of the present disclosure. Examples of alternative dual PMR writer designs are disclosed in related patent application HT17-032.

Figure 9:
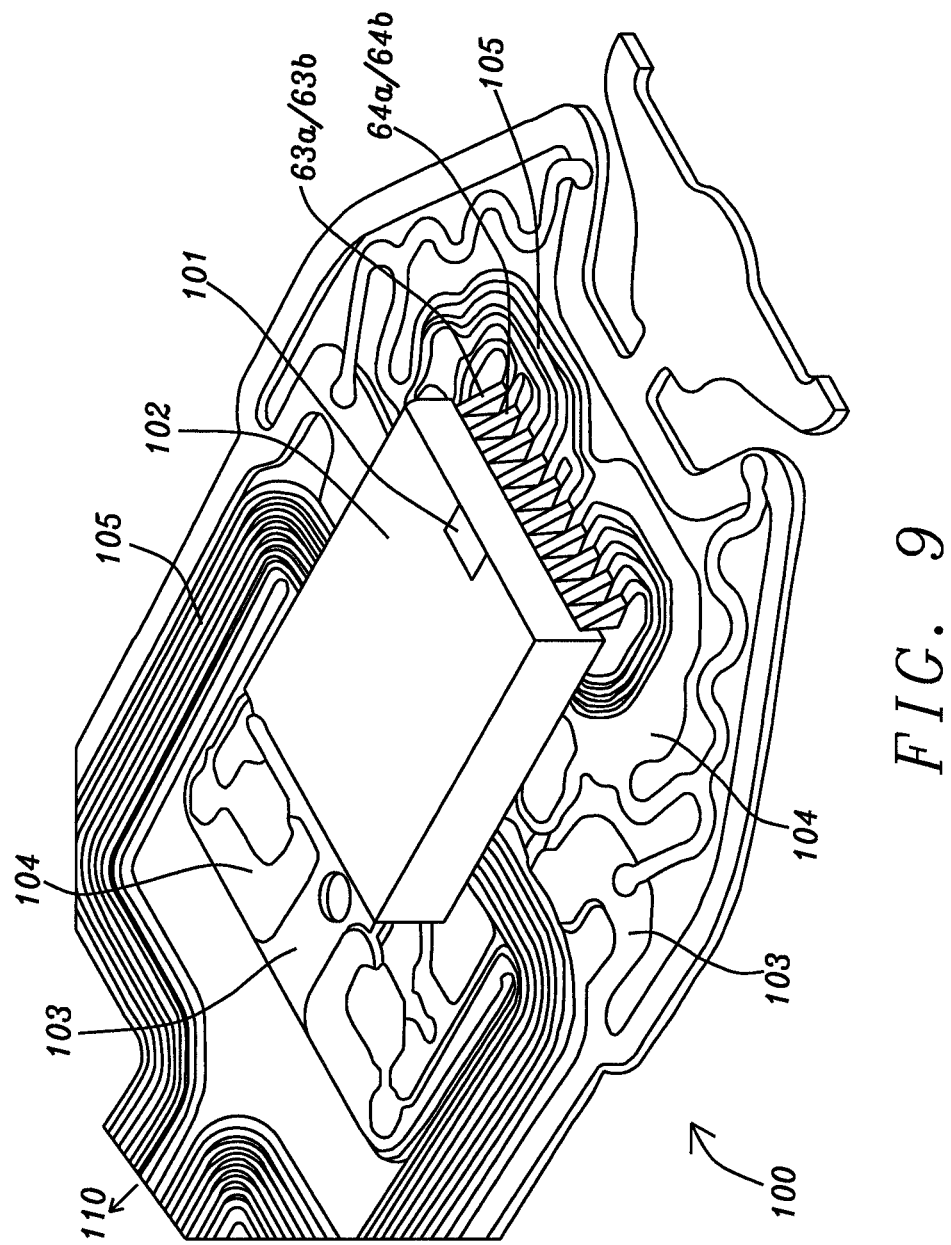
FIG. 9 is an oblique view of a slider on which a combined read/write head structure is mounted, and having adjoining pads and trace lines (wiring) formed on a suspension according to an embodiment of the present disclosure.

Referring to FIG. 9, HGA 100 is depicted and features suspension 103, an overlying dielectric layer 104, and slider 102 formed thereon. A combined read/write head 101 comprised of the dual PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of pads including pads 63, 64 are employed to control a current to the bucking coil, driving coil, DFH heaters, sensors, and one or more readers in the combined read/write head. Connections between the pads and the dual PMR writer components are within the slider and not visible from this view.

Figure 10:
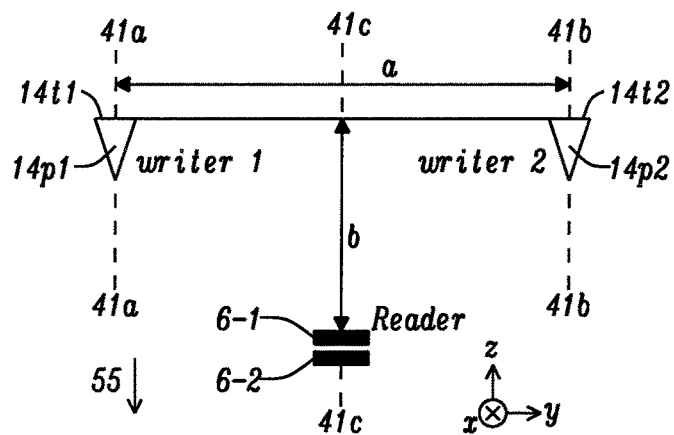
FIG. 10 is a schematic drawing of two writers with dual readers at a center plane midway between the two writers, and at 0 degree skew.

In FIG. 10, a schematic drawing is provided for a dual PMR writer at 0 skew where plane 41a-41a that bisects first main pole tip 14p1 and trailing edge 14t1 in the writer 1 is separated by cross-track distance a (WWS) from plane 41b-41b that bisects second main pole tip 14p2 and trailing edge 14t2 in writer 2. In the exemplary embodiment, the disk motion 55 is counterclockwise or downward over a magnetic medium (not shown). Although a dual reader is depicted with reader 6-1 formed above reader 6-2 at the center plane 41c-41c, there may be a single reader in an alternative embodiment. There is a down-track distance b between plane 42-42 and a top surface of reader 6-1. In this example, RWO=−a/2 for writer 1 and RWO=a/2 for writer 2.

Figure 11:
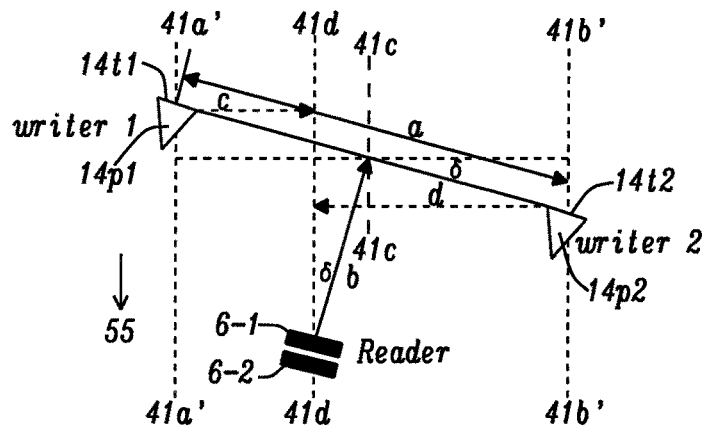
FIG. 11 is a schematic drawing of two writers with dual readers at a center plane midway between the two writers, and at δ skew where δ is unequal to 0 degrees.

FIG. 11 depicts the dual PMR writer at a δ skew during OD writing where δ is typically a negative degree angle. RWO is shown as c for writer 1 and is derived from the equation c=cos(δ)×[a/2+b×tan(δ)] while RWO for writer 2 is shown as d and derived from the equation d=cos(δ)×[a/2−b×tan(δ)]. Table 1 below lists the results for c and d at 0° skew and at −15° skew.

TABLE 1

Estimation of reader-writer offset RWO = "c" for writer 1 and RWO = "d" at 0° and −15° skew as a function of writer-writer spacing "a" and reader-writer spacing "b"

|  | Skew = 0 degrees | | | | Skew = −15 degrees | | | |
| --- | --- | --- | --- | --- | --- | --- | --- | --- |
| a (um) | 10 | 5 | 10 | 5 | 10 | 5 | 10 | 5 |
| b (um) | 5 | 5 | 4 | 4 | 5 | 5 | 4 | 4 |
| c (um) | −5.0 | −2.5 | −5.0 | −2.5 | −3.5 | −1.1 | −3.8 | −1.4 |
| d (um) | 5.0 | 2.5 | 5.0 | 2.5 | 6.1 | 3.7 | 5.9 | 3.5 |

Table 1 indicates that when WWS (a) is decreased at the same b value, then both c and d are reduced for both skew angles. However, when b is decreased while holding a constant, c becomes greater and d is reduced. At −15° skew, the absolute value of c is less than the corresponding value at 0° skew, but the absolute value of d is greater than the corresponding value at 0° skew. Thus, reducing b while maintaining a, or shrinking a while holding b constant are options for minimizing the growth in d for writer 2 at negative skew angles. The results in Table 1 where writer 1 has RWO=c and writer 2 has RWO=d relates to the case where both writers are UP facing (UP head configuration). In the mirror image case where both writers are down facing (DN head configuration), writer 1 now has RWO=d while writer 2 has RWO=c. Thus, the head orientation in the HGA enables the writer with the better performance at OD skew to also have the smaller RWO (c value).

In actual HDD applications, smaller RWO (c and d) are always preferred for less track misregistration (TMR) and better ADC. Since the outer disk (OD) area is larger than the inner disk (ID) area, and outer disk linear velocity is higher with more TMR concern, smaller RWO at OD skew can offer better area density capability than smaller RWO at ID skew if there is a choice. In related patent application HT17-032, a drawing (FIG. 7) shows an example of an up facing head configuration on a suspension that is used to write on a bottom of a recording disk, and a down facing head configuration on another suspension for writing on a top surface of a recording disk. Preferably, the writer having better performance at OD skew is formed as the inner writer (shorter distance from the recording disk center than the outer writer).

When track width (TW) shrinks below 100 nm, it is often difficult to achieve symmetry between writer 1 and writer 2, and there will be variations in performance between writers for a given target TW. However, we have found that mean ADC is improved and the sigma is tightened when the better writer for OD skew in the dual PMR writer of the present disclosure is integrated in a HGA as described in related patent application HT17-032. A method of fabricating a dual PMR writer structure is disclosed in related patent application HT17-030. According to one embodiment of the present disclosure, the TY/MP/tBY structure in writer 1 of a dual PMR writer may be symmetrical with respect to plane 41a-41a that bisects main pole tip 14a at the ABS while the TY/MP/tBY structure in writer 2 is symmetrical with respect to plane 41b-41b that bisects main pole tip 14b. Furthermore, each of the TY, MP, and tBY in writer 1 is a mirror image of the TY, MP, and tBY in writer 2 with respect to center plane 41c-41c. As shown with the top-down view in FIG. 12A, MP 14a has a substantially triangular shaped front portion 14-1 bounded by two sides 14s1 each extending from MP tip 14p1 at the ABS 30-30 to a third side (backside) 14d1 at height h. Each side 14s1 forms an angle θ where θ>0° and <90° with respect to plane 41a-41a. Similarly, MP 14b has a substantially triangular shaped front portion 14-1 with sides 14s1' extending from MP tip 14p2 to backside 14d2 at height h, and formed at angle θ with respect to plane 41b-41b. MP 14a has a rectangular shaped back portion 14-2 having two sides 14s2 aligned orthogonal to the ABS and extending from backside 14d1 to back end 14e1, and separated by cross-track width w that is generally in the range of 4-10 microns to allow sufficient magnetic flux to be delivered to MP tip 14p1 without unacceptable choking. Likewise, MP 14b has a rectangular shaped back portion 14-2 with two sides 14s2' aligned orthogonal to the ABS and extending from backside 14d2 to back end 14e2, and separated by cross-track width w. Spacing g between inner side 14s2 and inner side 14s2' may be at least 4 microns to prevent cross-talk between writer 1 and writer 2. As a result, WWS (a) is represented by the equation (a=w+g) where a may easily reach 8-14 microns at 0 degree skew.

In FIG. 12B, TY 36a in writer 1 and TY 36b in writer 2 are depicted from a top-down perspective. TY 36a has front portion 36-1 with a substantially trapezoidal shape wherein front side 36f1 is recessed at height r1 from ABS 30-30, and two sides 36s1 extend from opposite ends of the front side to backside 36d1 at height h and having cross-track width w. Rectangular back portion 36-2 adjoins the front portion at backside 36d1 and has two sides 36s2 aligned orthogonal to the ABS and connecting the backside to backend 36e1 that has cross-track width w. As in MP 14a, both of the back portion and front portion in TY 36a are symmetric with respect to plane 41a-41a. Similarly, TY 36b has front portion 36-1 with a substantially trapezoidal shape wherein front side 36f2 is recessed at height r1 from the ABS, and two sides 36s1' extend from opposite ends of the front side to backside 36d2 at height h and having cross-track width w. Rectangular back portion 36-2 adjoins the front portion at backside 36d2 and has two sides 36s2' aligned orthogonal to the ABS and connecting the backside to backend 36e2 that has width w. Similar to MP 14b, both of the back portion and front portion in TY 36b are symmetric with respect to plane 41b-41b. Accordingly, TY 36a is overlaid on MP 14a in the dual PMR writer structure so that backside 36d1 and backend 36e1 are essentially coplanar with backside 14d1 and backend 14e1, respectively. Likewise, TY 36b is overlaid on MP 14b such that backside 36d2 and backend 36e2 are essentially coplanar with backside 14d2 and backend 14e2, respectively.

Referring to FIG. 12C, tBY 35a in writer 1 and tBY 35b in writer 2 are depicted from a top-down perspective with overlying layers including MP 14a and MP 14b, respectively, removed. Front portion 35-1 in tBY 35a has a trapezoidal shape wherein front side 35f1 is recessed at height r2 from ABS 30-30, and two sides 35s1 extend from opposite ends of the front side to backside 35d1 having width w at height h. Rectangular back portion 35-2 adjoins backside 35d1 and has two sides 35s2 aligned orthogonal to the ABS and connecting backside 35d1 to backend 35e1 that has width w. Back and front portions of tBY 35a are symmetric with respect to plane 41a-41a. Similarly, tBY 35b has front portion 35-1 with a trapezoidal shape, front side 35f2 recessed at height r2 from the ABS, and two sides 35s1' extending from opposite ends of the front side to backside 35d2 of width w at height h. Rectangular back portion 35-2 adjoins backside 35d2 and has two sides 35s2' aligned orthogonal to the ABS and connecting backside 35d2 to backend 35e2 having width w. Back and front portions in tBY 35b are symmetric with respect to plane 41b-41b. Thus, backside 35d1 and backend 35e1 in tBY 35a are essentially coplanar with backside 14d1 and backend 14e1, respectively, in MP 14a, and backside 35d2 and backend 35e2 are essentially coplanar with backside 14d2 and backend 14e2, respectively, in MP 14b.

According to a second embodiment shown in FIG. 13A, MP 14a in writer 1 continues to have a rectangular back portion 14-2 with sides 14s2 and a backend 14e1 of width w, and plane 41a-41a bisects MP tip 41p1 at the ABS 30-30. However, there is asymmetry because rectangular back portion 14-2 is now bisected by plane 46-46 that is a greater distance from center plane 41c-41c than plane 41a-41a. Moreover, triangular front portion 14-1 is no longer bisected by plane 41a-41a. The benefit of the asymmetric MP shape is that WWS is reduced to a1 where a1<a, and is represented by the equation (a1=w+g−2s1) where s1 is the cross-track distance between plane 41c-41c and plane 46-46. MP 14b is the mirror image of MP 14a with respect to the center plane and has asymmetry since plane 47-47 that bisects the rectangular back portion 14-2 is offset by cross-track distance s1 from plane 41b-41b that no longer bisects triangular front portion 14-1. As a result, plane 41b-41b is closer to the center plane than plane 47-47. Thus, RWO for writer 1 is reduced from −a/2 to −(a1)/2 and RWO for writer 2 is reduced from a/2 to (a1)/2 since dimensions g and w are preferably maintained from the first embodiment.

Front portion 14-1 of MP 14a has outer side 14s1 formed at angle β with respect to plane 41a-41a, and inner side 14s3 formed at angle α with respect to plane 41a-41a, and where β>α. Sides 14s1, 14s3 form a triangular shape with backside 14d1. Similarly, front portion 14-1 of MP 14b has outer side 14s1' formed at angle θ with respect to plane 41b-41b, and inner side 14s3' formed at angle α with respect to plane 41b-41b. Sides 14s1', 14s3' form a triangular shape with backside 14d2.

In FIG. 13B, the TY shape of the second embodiment is depicted with TY 36a in writer 1 and TY 36b in writer 2 from a top-down view with overlying layers removed. TY 36a retains rectangular back portion 36-2 described previously, except the back portion is now bisected by plane 46-46. Front portion 36-1 has a substantially trapezoidal shape but is no longer symmetrical because inner side 36s3 is a closer distance to plane 41a-41a than outer side 36s1 at front side 36f1 and at backside 36d1 at height h. Backsides 36d1, 36e1 maintain cross-track width w from the first embodiment, and separation between inner side 36s2 on TY 36a and inner side 36s2' on TY 36b is still cross-track width g. As in the MP shape, plane 41a-41a in writer 1 and plane 41b-41b in writer 2 are closer to center plane 41c-41c by cross-track width s1 than plane 46-46 and plane 47-47, respectively. Similarly, TY 36b retains rectangular back portion 36-2 described previously, except the back portion is now bisected by plane 47-47. Front portion 36-1 has a substantially trapezoidal shape but is no longer symmetrical because inner side 36s3' is a closer distance to plane 41b-41b than outer side 36s1' at front side 36f2 and at backside 36d2.

FIG. 13C shows the tBY shape of the second embodiment with tBY 35a in writer 1 and tBY 35b in writer 2 from a top-down view with overlying layers removed. Note that tBY 35a retains rectangular back portion 35-2 described previously, but the back portion is now bisected by plane 46-46. Front portion 35-1 has a trapezoidal shape but is no longer symmetrical because inner side 35s3 is a closer distance to plane 41a-41a than outer side 35s1 at front side 35f1 and at backside 35d1 at height h. Backsides 35d1, 35e1 maintain cross-track width w from the first embodiment, and separation between inner side 35s2 on tBY 35a and inner side 35s2' on tBY 35b is still the width g. Also, tBY 35b retains rectangular back portion 35-2 from the previous embodiment but the back portion is now bisected by plane 47-47. Front portion 35-1 has a trapezoidal shape but is no longer symmetrical because inner side 35s3' is a closer distance to plane 41b-41b than outer side 35s1' at front side 35f2 and at backside 35d2.

Referring to FIG. 14A, a third embodiment of MP shapes in a dual PMR writer of the present disclosure is shown. Each of MP 14a in writer 1 and MP 14b in writer 2 continue to have a rectangular shaped back portion 14-2 of width w, and bisected by plane 46-46 and plane 47-47, respectively, as in the second embodiment. Furthermore, symmetrical front portions 14-1 are retained from the first embodiment where MP tip 14p1 and MP tip 14p2 are bisected by plane 41a-41a and plane 41b-41b, respectively, and wherein two sides 14s1 (or 14s1') are formed with equal angles θ with respect to plane 41a-41a (or plane 41b-41b). However, plane 41a-41a is a cross-track distance s2 closer to center plane 41c-41c than plane 46-46, and plane 41b-41b is cross-track distance s2 closer to the center plane than plane 47-47 because front and back portions are now separated from one another. Note that front portion backsides 14d1 in MP 14a, and 14d2 in MP 14b are now at height e from ABS 30-30 where e<h.

A key feature of the third embodiment is an asymmetrical middle portion 14-3 inserted between front and back portions. In the exemplary embodiment, the middle portion has a trapezoidal shape with a front side coinciding with backside 14d1 in MP 14a or with backside 14d2 in MP 14b. There is a second side aligned orthogonal to the ABS 30-30 and comprised of a front section of inner side 14s4 (or 14s4'), which extends to backend 14e1 (or 14e2). The middle portion second side ends at height h, and at a third side (backside) 14c1 (or 14c2) of the trapezoid having width w. The fourth (outer) side of the middle portion in writer 1 has angle γ with respect to plane 46-46 and connects outer side 14s1 to backside 14c1 at a corner with back portion outer side 14s2. In writer 2, the fourth side has angle γ with respect to plane 47-47 and connects outer side 14s1' to backside 14c2 at a corner with back portion outer side 14s2'.

The benefit of the asymmetric MP shape in FIG. 14A is that WWS is reduced to a2 where a2<a, and is represented by the equation (a2=w+g−2s2) where s2 is the cross-track distance between plane 41c-41c and plane 46-46. MP 14b is the mirror image of MP 14a with respect to the center plane and has asymmetry since plane 47-47 that bisects the rectangular back portion 14-2 is offset by cross-track distance s2 from plane 41b-41b. As a result, plane 41b-41b is closer than plane 47-47 to the center plane. Accordingly, RWO for writer 1 is reduced from −a/2 to −(a2)/2 and RWO for writer 2 is reduced from a/2 to (a2)/2 since dimensions g and w are preferably maintained from the first embodiment.

In FIG. 14B, the TY shape of the third embodiment is depicted with TY 36a in writer 1 and TY 36b in writer 2 from a top-down view with overlying layers removed. TY 36a retains rectangular back portion 36-2 described previously in the second embodiment, and symmetrical front portion 36-1 from the first embodiment. A key feature is an asymmetrical middle portion 36-3 with a trapezoidal shape inserted between front and back portions. The middle portion has a front side at height e coinciding with backside 36d1 in TY 36a or with backside 36d2 in TY 36b. There is a second side aligned orthogonal to the ABS 30-30 and comprised of a front section of inner side 36s4 (or 36s4'), which extends to backend 36e1 (or 36e2). The middle portion second side ends at height h, and at a third side (backside) 36c1 (or 36c2) having width w. The fourth (outer) side 36s3 (or 36s3') overlays on side 14s3 (or 14s3') in MP 14a (or in MP 14b) thereby connecting front portion outer side 36s1 to backside 36c1 at a corner with back portion outer side 36s2 in writer 1, or connecting front portion outer side 36s1' to backside 36c2 at a corner with back portion outer side 36s2' in writer 2.

Referring to FIG. 14C, the tBY shape of the third embodiment is depicted with tBY 35a in writer 1 and tBY 35b in writer 2 from a top-down view with overlying layers removed. tBY 35a retains rectangular back portion 35-2 described previously in the second embodiment, and symmetrical front portion 35-1 from the first embodiment. A key feature is an asymmetrical middle portion 35-3 with a trapezoidal shape inserted between front and back portions. The middle portion has a front side at height e coinciding with backside 35d1 in TY 35a or with backside 35d2 in TY 35b. There is a second side aligned orthogonal to the ABS 30-30 and comprised of a front section of inner side 35s4 (or 35s4'), which extends to backend 35e1 (or 35e2). The middle portion second side ends at height h, and at a third side (backside) 35c1 (or 35c2) having width w. The fourth (outer) side 35s3 (or 35s3') is overlaid by side 14s3 (or 14s3') in MP 14a (or in MP 14b) thereby connecting front portion outer side 35s1 to backside 35c1 at a corner with back portion outer side 35s2 in writer 1, or connecting front portion outer side 35s1' to backside 35c2 at a corner with back portion outer side 35s2' in writer 2.

Figure 12A:
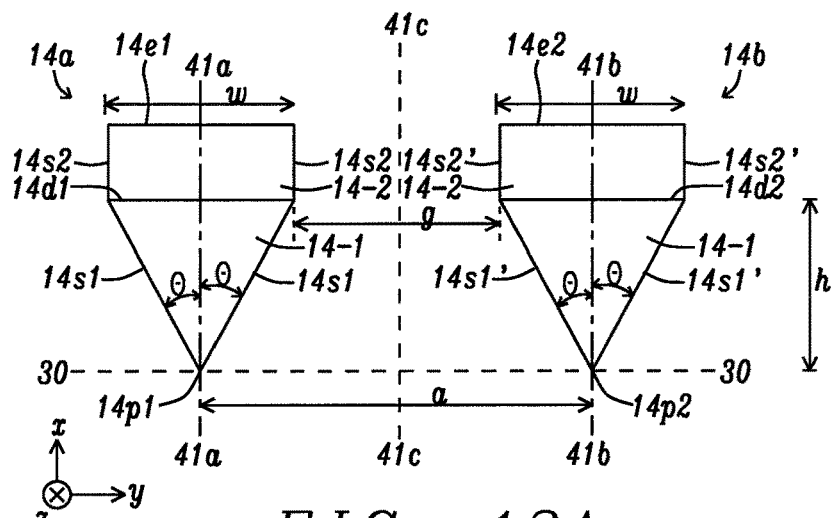
FIG. 12A is a top-down view of a symmetric main pole design in which each main pole has a triangular shaped front portion with a pole tip at the ABS, and a rectangular back portion according to an embodiment of the present disclosure.

With both of the second embodiment (FIGS. 13A-13C) and the third embodiment (FIGS. 14A-14C), WWS may be substantially minimized such that RWO in each writer is about 3 microns or less at 0 degree skew and is a considerable improvement over RWO in a symmetrical design in FIGS. 12A-12C when w and g are maintained in each case.

The same fabrication scheme used to build a single writer may be employed to fabricate the dual PMR writer structures of the present disclosure so that no additional product cost is incurred. Moreover, there is flexibility in the design in that a plurality of base writer structures as well as sharing or separation of substantial portions of leading and trailing magnetic flux loops are compatible with the TY/MP/tBY shapes disclosed herein. A process flow for fabricating a dual PMR writer is found in related patent application HT17-030.

Key features of fabricating a dual PMR writer according to the present disclosure are depicted in FIGS. 15-16. Referring to FIG. 15, an ABS view is depicted of side shield layer 12 deposited on leading shield 11 wherein the leading shield is formed on a substrate (not shown) that may comprise one or two readers at center plane 41c-41c. The side shield layer has top surface 12t and is patterned by a conventional photolithography method followed by an ion beam etch (IBE) or reactive ion etch (RIE) process to form opening 80a with sidewalls 12s1 equidistant from plane 41a-41a, and opening 80b having sidewalls 12s2 equidistant plane 41b-41b. As a result, leading shield top surface 11t at plane 43-43 is exposed in the openings. If a tapered leading side of the main pole layers is desired, a conventional IBE technique is performed at this point such that the main pole top surface within the openings is no longer orthogonal to planes 41a-41a and 41b-41b.

A dielectric material is conformally deposited by a plasma enhanced chemical vapor deposition (PECVD) method or the like on the sides 12s1, 12s2 and top surface 11t to partially fill openings 80a, 80b. As a result, leading gap 13 is formed on top surface 11t and side gaps 15 are generated on sides 12s1, 12s2. The leading gap and side gap layers may be comprised of one or more dielectric materials including alumina, silica, and other metal oxides, nitrides, or oxynitrides. On the aforementioned gap layers, there may also be an uppermost metal layer (not shown) such as Ru that promotes the deposition of uniform main pole layers during a subsequent plating process.

Referring to FIG. 16, first main pole layer (MP1) with main pole tip 14p1 and the second main pole layer (MP2) with main pole tip 14p2 are simultaneously plated in opening 80a and opening 80b, respectively, by a conventional method and then a chemical mechanical polish (CMP) process is performed to generate trailing sides 14t1 and 14t2 in MP1 and MP2, respectively, that are coplanar with top surfaces 12t of side shields 12. Those skilled in the art will appreciate that at this point, a well known process sequence may be employed to form a taper on the trailing sides 14t1, 14t2 such that a down-track distance between the trailing sides and plane 42-42 becomes greater with increasing distance from the ABS up to a throat height, for example. It is important that the shape of MP1 is essentially a mirror image of the MP2 shape with respect to center plane 41c-41c. Thus, any of the MP shapes described in FIG. 12A, FIG. 13A, or FIG. 14A are compatible with the aforementioned process. Thereafter, a conventional series of steps is employed to form a write gap 16, hot seed layer 17, trailing shield 18, as well as other layers overlying MP1 and MP2. As a final step in the dual PMR writer fabrication, a lapping process (not shown) is performed to generate the main pole tip in MP1 that is bisected by plane 41a-41a at the ABS, and that forms the main pole tip in MP2 that is bisected by plane 41b-41b at the ABS.

While the present disclosure has been particularly shown and described with reference to, the preferred embodiment thereof, it will be understood by those skilled in the art that various changes in form and details may be made without departing from the spirit and scope of this disclosure.

I claim:

1. A dual perpendicular magnetic recording (PMR) writer, comprising:
   (a) a first main pole layer (MP1) in a first writer on a slider, and having a first main pole tip (T1) at an air bearing surface (ABS) wherein T1 is bisected by a first plane that is at a first cross-track position and orthogonal to the ABS;
   (b) a second main pole layer (MP2) in a second writer on the slider and having a second main pole tip (T2) at the ABS wherein T2 is bisected by a second plane that is orthogonal to the ABS and at a second cross-track position that is a writer-writer spacing (WWS) from the first plane, wherein MP1 and MP2 are mirror images with respect to a center plane that separates the first and second writers, and wherein each of MP1 and MP2 comprise:
      (1) a triangular shaped front portion having two sides formed at an angle θ>0° and <90° with respect to the first plane in MP1 and with respect to the second plane in MP2, and extending to a backside; and
      (2) a rectangular shaped back portion with a front side coinciding with the front portion backside and having a width "w", two sides aligned Orthogonal to the ABS and extending from the front side to a backend having the width "w", and wherein the rectangular shaped back portion is bisected by the first plane in MP1 and by the second plane in MP2;
   (c) a first top yoke (TY1) formed on MP1, bisected by the first plane, and with a front side recessed from the ABS, and a second top yoke (TY2) formed on MP2, bisected by the second plane and with a front side recessed from the ABS; and
   (d) a first tapered bottom yoke (tBY1) adjoining a bottom side of MP1, bisected by the first plane, and having a front side recessed from the ABS, and a second tapered bottom yoke (tBY2) adjoining a bottom side of MP2, bisected by the second plane, and having a front side recessed from the ABS.

2. The dual PMR writer of claim 1 wherein each of TY1, TY2, tBY1, and tBY2 have a rectangular shaped back portion having the width "w".

3. The dual PMR writer of claim 1 wherein a base structure comprises a leading loop for magnetic flux return from a magnetic medium to MP1 or MP2 wherein the leading loop is terminated at a leading shield, and comprises a trailing loop that is comprised of a trailing shield structure at the ABS, and a PP3 trailing shield over a driving coil and that adjoins a top surface of one or both of TY1 and TY2.

4. The dual PMR writer of claim 1 wherein a base structure comprises a leading loop for magnetic flux return from a magnetic medium to MP1 or MP2 wherein the leading loop is terminated at a return path (RTP), and is comprised of a leading shield, the RTP, and a connection between the leading shield and RTP, and a trailing loop is comprised of a trailing shield structure at the ABS, and a PP3 trailing shield formed over a driving coil and that adjoins a top surface of one or both of TY1 and TY2.

5. The dual PMR writer of claim 1 wherein a base structure comprises a leading loop for magnetic flux return from a magnetic medium to MP1 or MP2 wherein the leading loop is comprised of a leading shield, a return path (RTP), a connection between the leading shield and RTP, a lower back gap (LBG) connection on the RTP, and a back gap connection (BGC) on the LBG wherein the BGC adjoins a bottom of one or both of tBY1 or tBY2, and a trailing loop is comprised of a trailing shield structure at the ABS, and a PP3 trailing shield formed over a driving coil, and that adjoins a top surface of one or both of TY1 and TY2.

6. The dual PMR writer of claim 5 wherein the connection between the leading shield and RTP has a front side at the ABS.

7. The dual PMR writer of claim 5 wherein the base structure is formed in the first writer, and an equivalent base structure is formed in the second writer such that each writer has a separate leading loop and trailing loop, and wherein TY1, MP1, and tBY1 are separated from TY2, MP2, and tBY2, respectively.

8. The dual PMR writer of claim 5 wherein the base structure is shared by the first writer and the second writer, and wherein TY1, MP1, and tBY1 are separated from TY2, MP2, and tBY2, respectively.

9. The dual PMR writer of claim 5 wherein the trailing loop and the leading loop except for the LBG and BGC are shared by the first writer and second writer such that the first writer and second writer have separate LBG and BGC, and wherein TY1, MP1, and tBY1 are separated from TY2, MP2, and tBY2, respectively.

10. The dual PMR writer of claim 1 wherein an inner side of the rectangular back portion in MP1, and an inner side of the rectangular back portion in MP2 are separated by a distance "g", and WWS is equal to "g"+"w".

11. A head gimbal assembly (HGA), comprising:
    (a) the dual PMR writer and slider of claim 1; and
    (b) a suspension that elastically supports the slider, wherein the suspension has a flexure to which the slider is joined, a load beam with one end connected to the flexure, and a base plate connected to the other end of the load beam.

12. A magnetic recording apparatus, comprising:
    (a) the HGA of claim 11;
    (b) a magnetic recording medium positioned opposite to the slider;
    (c) a spindle motor that rotates and drives the magnetic recording medium; and
    (d) a device that supports the slider, and that positions the slider relative to the magnetic recording medium.

13. A dual perpendicular magnetic recording (PMR) writer, comprising:
    (a) a first main pole layer (MP1) in a first writer on a slider, and having a first main pole tip (T1) at an air bearing surface (ABS) wherein T1 is bisected by a first plane that is at a first cross-track position and orthogonal to the ABS;
    (b) a second main pole layer (MP2) in a second writer on the slider and having a second main pole tip (T2) at the ABS wherein T2 is bisected by a second plane that is orthogonal to the ABS and at a second cross-track position that is a writer-writer spacing (WWS) from the first plane, wherein MP1 and MP2 are mirror images with respect to a center plane that separates the first and second writers, and wherein each of MP1 and MP2 comprise:
       (1) a triangular shaped front portion having first and second sides extending from T1 or T2 to a backside at a first height from the ABS; and
       (2) a rectangular shaped back portion having a width "w", an inner side and outer side each aligned orthogonal to the ABS and connecting a front side thereof to a backend, and wherein the rectangular shaped back portion is bisected by a third plane in MP1 that is a first cross-track distance farther from the center plane than the first plane, and is bisected by a fourth plane in MP2 that is the first cross-track distance farther from the center plane than the second plane;

(c) a first top yoke (TY1) formed on MP1, and with a front side recessed from the ABS, and a second top yoke (TY2) formed on MP2, and with a front side recessed from the ABS; and (d) a first tapered bottom yoke (tBY1) adjoining a bottom side of MP1, and having a front side recessed from the ABS, and a second tapered bottom yoke (tBY2) adjoining a bottom side of MP2, and having a front side recessed from the ABS.

14. The dual PMR writer of claim 13 wherein TY1, and tBY1 comprise a rectangular shaped back portion having the width "w" and that is bisected by the third plane, and wherein TY2 and tBY2 comprise a rectangular shaped back portion of width "w" and that is bisected by the fourth plane.

15. The dual PMR writer of claim 13 wherein the rectangular shaped back portion front side coincides with the front portion backside in each of MP1 and MP2, and wherein the front portion first side is an inner side formed at angle $\alpha$ with respect to the first plane, the second side is a front portion outer side formed at angle $\beta$ with respect to the first plane where $\beta>\alpha$, the inner side of the rectangular back portion in MP1, and the inner side of the rectangular back portion in MP2 are separated by a cross-track distance "g", the first cross-track distance is s1, and WWS is equal to "g"+"w"−2s1.

16. The dual PMR writer of claim 13 further comprising a trapezoidal shaped middle portion in MP1 and MP2 with a front side that coincides with the triangular front portion backside, an outer side formed at angle $\gamma$ with respect to the third plane in MP1 and with respect to the fourth plane in MP2, an inner side that is coplanar with the inner side of the rectangular shaped back portion, and a backside that coincides with the rectangular shaped back portion front side.

17. The dual PMR writer of claim 16 wherein each of the first and second sides in the triangular front portion form an angle $\theta$ with respect to the first plane in MP1 and with respect to the second plane in MP2, and wherein the inner side of the rectangular back portion in MP1, and the inner side of the rectangular back portion in MP2 are separated by a cross-track distance "g", the first cross-track distance is s2, and WWS is equal to "g"+"w"−2s2.

18. The dual PMR writer of claim 13 wherein a base structure comprises a leading loop for magnetic flux return from a magnetic medium to MP1 or MP2 wherein the leading loop is terminated at a leading shield, and comprises a trailing loop that is comprised of a trailing shield structure at the ABS, and a PP3 trailing shield over a driving coil and that adjoins a top surface of one or both of TY1 and TY2.

19. The dual PMR writer of claim 13 wherein a base structure comprises a leading loop for magnetic flux return from a magnetic medium to MP1 or MP2 wherein the leading loop is terminated at a return path (RTP), and is comprised of a leading shield, the RTP, and a connection between the leading shield and RTP, and a trailing loop is comprised of a trailing shield structure at the ABS, and a PP3 trailing shield formed over a driving coil and that adjoins a top surface of one or both of TY1 and TY2.

20. The dual PMR writer of claim 13 wherein a base structure comprises a leading loop for magnetic flux return from a magnetic medium to MP1 or MP2 wherein the leading loop is comprised of a leading shield, a return path (RTP), a connection between the leading shield and RTP, a lower back gap (LBG) connection on the RTP, and a back gap connection (BGC) on the LBG wherein the BGC adjoins a bottom of one or both of tBY1 or tBY2, and a trailing loop is comprised of a trailing shield structure at the ABS, and a PP3 trailing shield formed over a driving coil and that adjoins a top surface of one or both of TY1 and TY2.

21. The dual PMR writer of claim 20 wherein the connection between the leading shield and RTP has a front side at the ABS.

22. The dual PMR writer of claim 20 wherein the base structure is formed in the first writer, and an equivalent base structure is formed in the second writer such that each writer has a separate leading loop and trailing loop, and wherein TY1, MP1, and tBY1 are separated from TY2, MP2, and tBY2, respectively.

23. The dual PMR writer of claim 20 wherein the base structure is shared by the first writer and the second writer such that there is only one leading loop and one trailing loop, and wherein TY1, MP1, and tBY1 are separated from TY2, MP2, and tBY2, respectively.

24. The dual PMR writer of claim 20 wherein the trailing loop and the leading loop except for the LBG and BGC are shared by the first writer and second writer such that the first writer and second writer have separate LBG and BGC, and wherein TY1, MP1, and tBY1 are separated from TY2, MP2, and tBY2, respectively.

25. A head gimbal assembly (HGA), comprising:
(a) the dual PMR writer and slider of claim 13; and
(b) a suspension that elastically supports the slider wherein the suspension has a flexure to which the slider is joined, a load beam with one end connected to the flexure, and a base plate connected to the other end of the load beam.

26. A magnetic recording apparatus, comprising:
(a) the HGA of claim 25;
(b) a magnetic recording medium positioned opposite to the slider;
(c) a spindle motor that rotates and drives the magnetic recording medium; and
(d) a device that supports the slider, and that positions the slider relative to the magnetic recording medium.

27. A method of forming a dual perpendicular magnetic recording (PMR) writer; comprising:
(a) sequentially depositing a leading shield and a side shield (SS) layer on a substrate, forming a first opening with sides in the SS layer that is bisected by a first plane formed orthogonal to an air bearing surface (ABS) plane, and forming a second opening with sides in the SS layer bisected by a second plane formed parallel to the first plane and a first cross-track width therefrom, wherein the first and second openings expose a top surface of the leading shield;
(b) depositing a gap layer on the leading shield top surface and on the sides of the first and second openings to partially fill said openings;
(c) simultaneously plating a first main pole (MP1) layer to fill the first opening, and a second main pole (MP2) layer to fill the second opening wherein MP1 and MP2 are mirror images with respect to a center plane that separates MP1 and MP2; and
(d) performing a lapping process to generate an ABS at the ABS plane, form a first pole tip (T1) in MP1 and a second pole tip (T2) in MP2 at the ABS, wherein T1 is bisected by the first plane and T2 is bisected by the second plane, and wherein each of MP1 and MP2 comprise:
(1) a triangular shaped front portion having first and second sides extending from T1 or T2 to a backside at a first height from the ABS; and (2) a rectangular shaped back portion having a width "w", an inner side and outer side each aligned orthogonal to the ABS and connecting a front side thereof to a backend, and wherein the rectangular shaped back portion is bisected by a third plane in MP1 that is a first cross-track distance farther from the center plane than the first plane, and is bisected by a fourth plane in MP2 that is the first cross-track distance farther from the center plane than the second plane.

28. The method of claim 27 wherein the rectangular shaped back portion front side coincides with the front portion backside in each of MP1 and MP2, and wherein the front portion first side in each of MP1 and MP2 is an inner side formed at angle $\alpha$ with respect to the first plane, and the second side is a front portion outer side formed at angle $\beta$ with respect to the first plane where $\beta>\alpha$, and wherein the inner side of the rectangular back portion in MP1, and the inner side of the rectangular back portion in MP2 are separated by a cross-track distance "g", the first cross-track distance is s1, and writer-writer spacing (WWS) between T1 and T2 is equal to "g"+"w"−2s1.

29. The method of claim 27 wherein each of MP1 and MP2 further comprises a trapezoidal shaped middle portion with a front side that coincides with the triangular front portion backside, an outer side formed at angle $\gamma$ with respect to the third plane in MP1 and with respect to the fourth plane in MP2, an inner side that is coplanar with the inner side of the rectangular shaped back portion, and a backside that coincides with the rectangular back portion front side.

30. The method of claim 29 wherein each of the first and second sides in the front triangular portion form an angle $\theta$ with respect to the first plane in MP1 and with respect to the second plane in MP2, and wherein the inner side of the rectangular back portion in MP1, and the inner side of the rectangular back portion in MP2 are separated by a cross-track distance "g", the first cross-track distance is s2, and WWS is equal to "g"+"w"−2s2.

31. The method of claim 27 wherein the substrate comprises a single reader or two readers at the center plane.

* * * * *